(12) United States Patent
Wong et al.

(10) Patent No.: US 11,644,480 B2
(45) Date of Patent: May 9, 2023

(54) THERMALLY STABLE, DRIFT RESISTANT PROBE FOR A SCANNING PROBE MICROSCOPE AND METHOD OF MANUFACTURE

(71) Applicant: Bruker Nano, Inc., Santa Barbara, CA (US)

(72) Inventors: Jeffrey K. Wong, Simi Valley, CA (US); Deepkishore Mukhopadhyay, Ventura, CA (US)

(73) Assignee: Bruker Nano, Inc., Santa Barbara, CA (US)

(*) Notice: Subject to any disclaimer, the term of this patent is extended or adjusted under 35 U.S.C. 154(b) by 0 days.

(21) Appl. No.: 16/634,942

(22) PCT Filed: Aug. 3, 2018

(86) PCT No.: PCT/US2018/045254
§ 371 (c)(1),
(2) Date: Jan. 29, 2020

(87) PCT Pub. No.: WO2019/028416
PCT Pub. Date: Feb. 7, 2019

(65) Prior Publication Data
US 2020/0241038 A1 Jul. 30, 2020

Related U.S. Application Data

(60) Provisional application No. 62/541,617, filed on Aug. 4, 2017, provisional application No. 62/540,959, filed on Aug. 3, 2017.

(51) Int. Cl.
*G01Q 60/38* (2010.01)
*G01Q 10/04* (2010.01)

(52) U.S. Cl.
CPC ............. *G01Q 60/38* (2013.01); *G01Q 10/04* (2013.01)

(58) Field of Classification Search
CPC .............................. G01Q 60/38; G01Q 10/04
USPC ......................................... 850/40, 59, 56, 60
See application file for complete search history.

(56) References Cited

U.S. PATENT DOCUMENTS

| 5,908,981 | A | 6/1999 | Atalar et al. |
| 7,441,447 | B2 | 10/2008 | Degertekin et al. |
| 9,482,691 | B1 | 11/2016 | Ukhanov et al. |

(Continued)

FOREIGN PATENT DOCUMENTS

| JP | H06-036364 | 2/1994 |
| JP | 08-105801 | 4/1996 |
| JP | 09-304410 | 11/1997 |

(Continued)

*Primary Examiner* — Nicole M Ippolito
(74) *Attorney, Agent, or Firm* — Boyle Fredrickson S.C.

(57) ABSTRACT

A probe assembly for a surface analysis instrument such as an atomic force microscope (AFM) that accommodates potential thermal drift effects includes a substrate defining a base of the probe assembly, a cantilever extending from the base and having a distal end, and a reflective pad disposed at or near the distal end. The reflective pad has a lateral dimension (e.g., length) between about twenty-five (25) microns, and can be less than a micron. Ideally, the reflective pad is patterned on the cantilever using photolithography. A corresponding method of manufacture of the thermally stable, drift resistant probe is also provided.

18 Claims, 5 Drawing Sheets

(56) References Cited

U.S. PATENT DOCUMENTS

2006/0075803 A1* 4/2006 Boisen ................ G01N 29/036
　　　　　　　　　　　　　　　　　　　　　73/866.5
2010/0031405 A1* 2/2010 Kley ...................... G01Q 70/12
　　　　　　　　　　　　　　　　　　　　　850/52

FOREIGN PATENT DOCUMENTS

| JP | H09-304410 | 11/1997 |
| JP | 2007147347 | 6/2007 |
| JP | 2007-192637 | 8/2007 |
| WO | 2013114099 | 8/2013 |

* cited by examiner

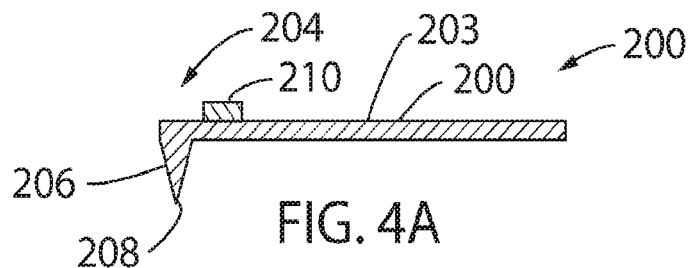
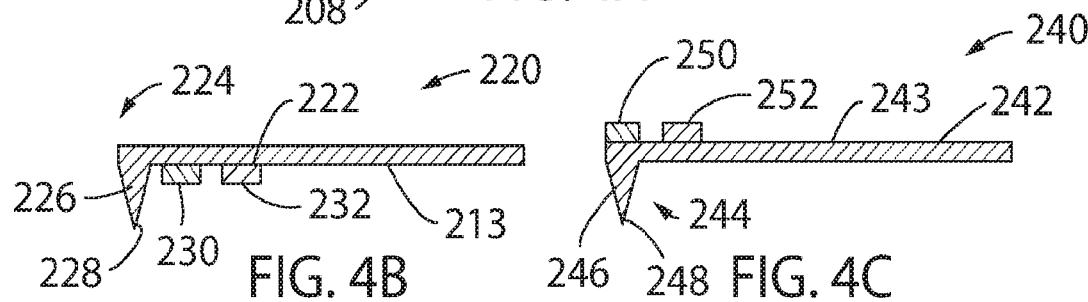
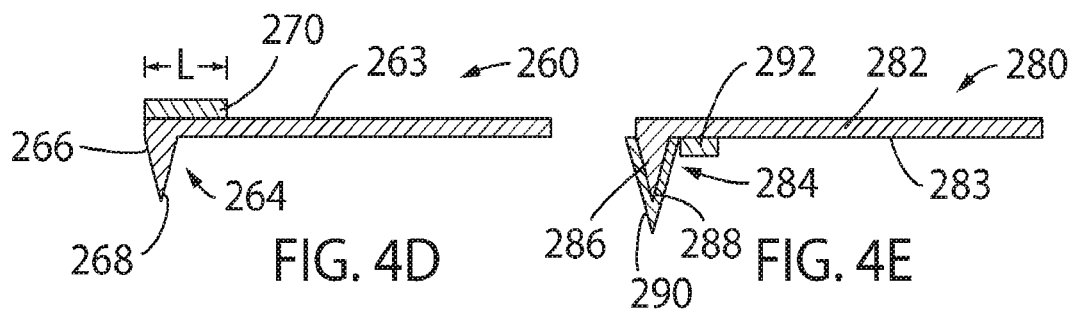
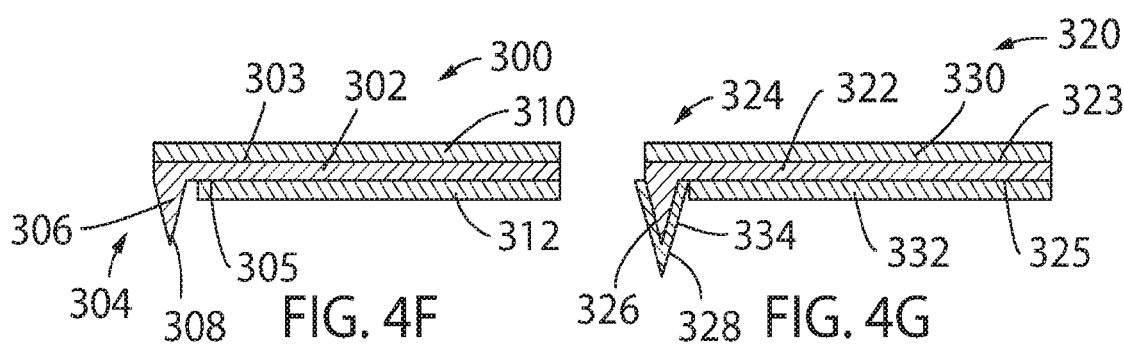

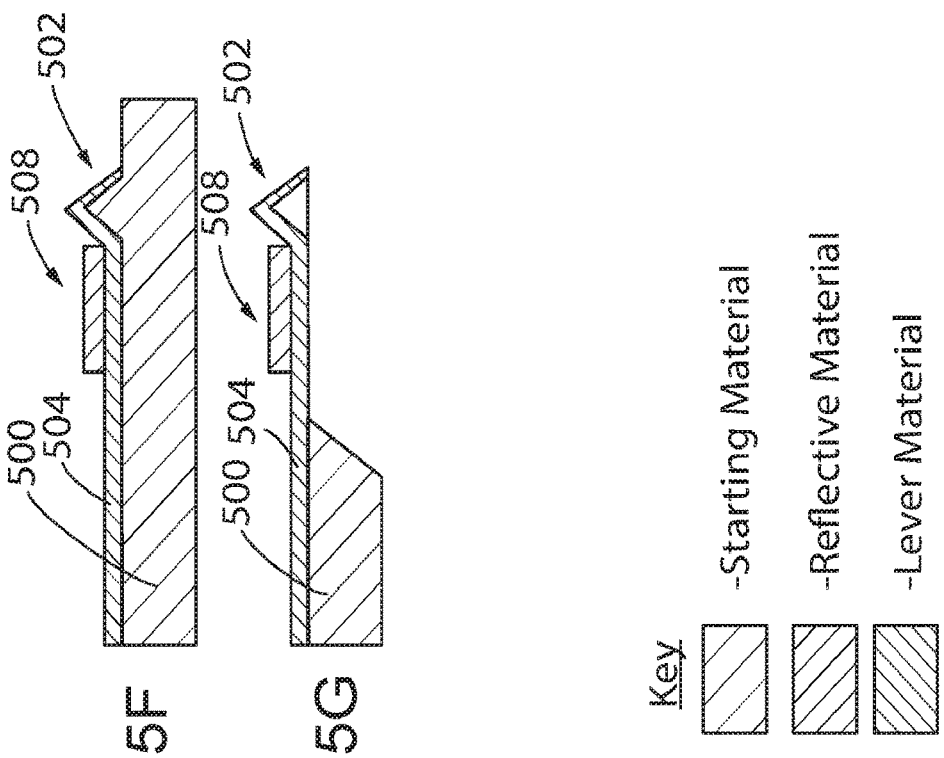
FIG. 5F
FIG. 5G
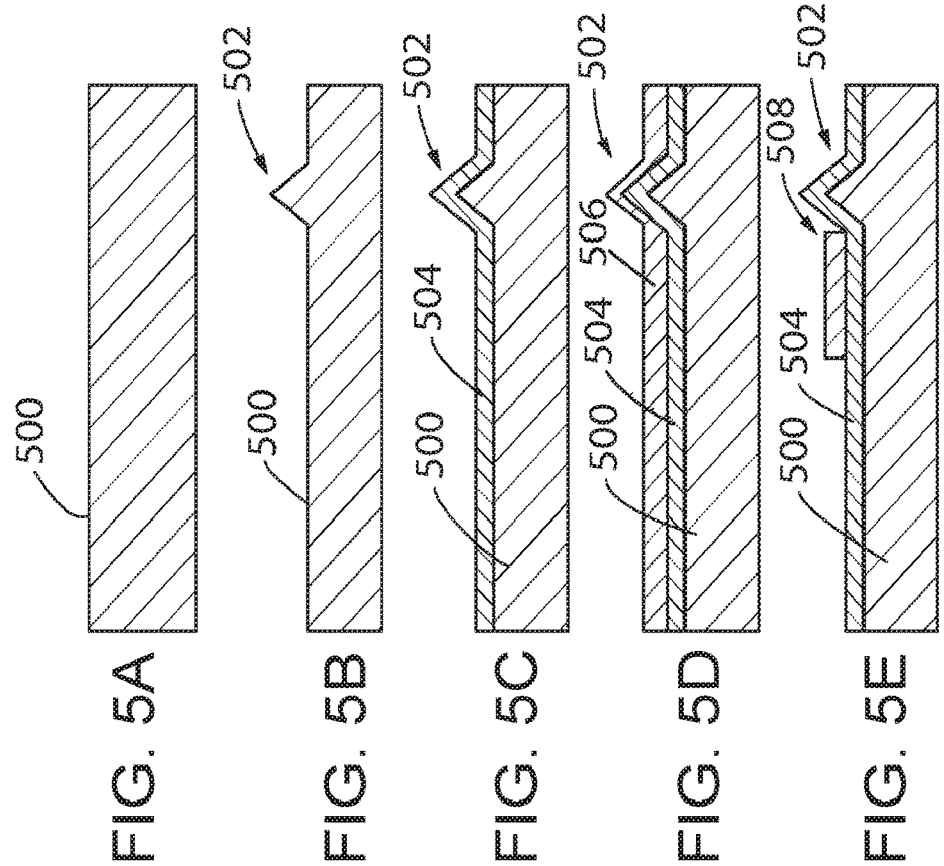
FIG. 5A
FIG. 5B
FIG. 5C
FIG. 5D
FIG. 5E
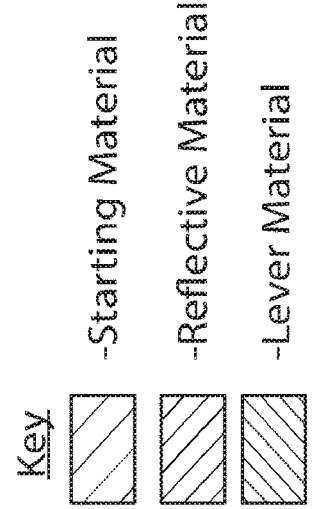

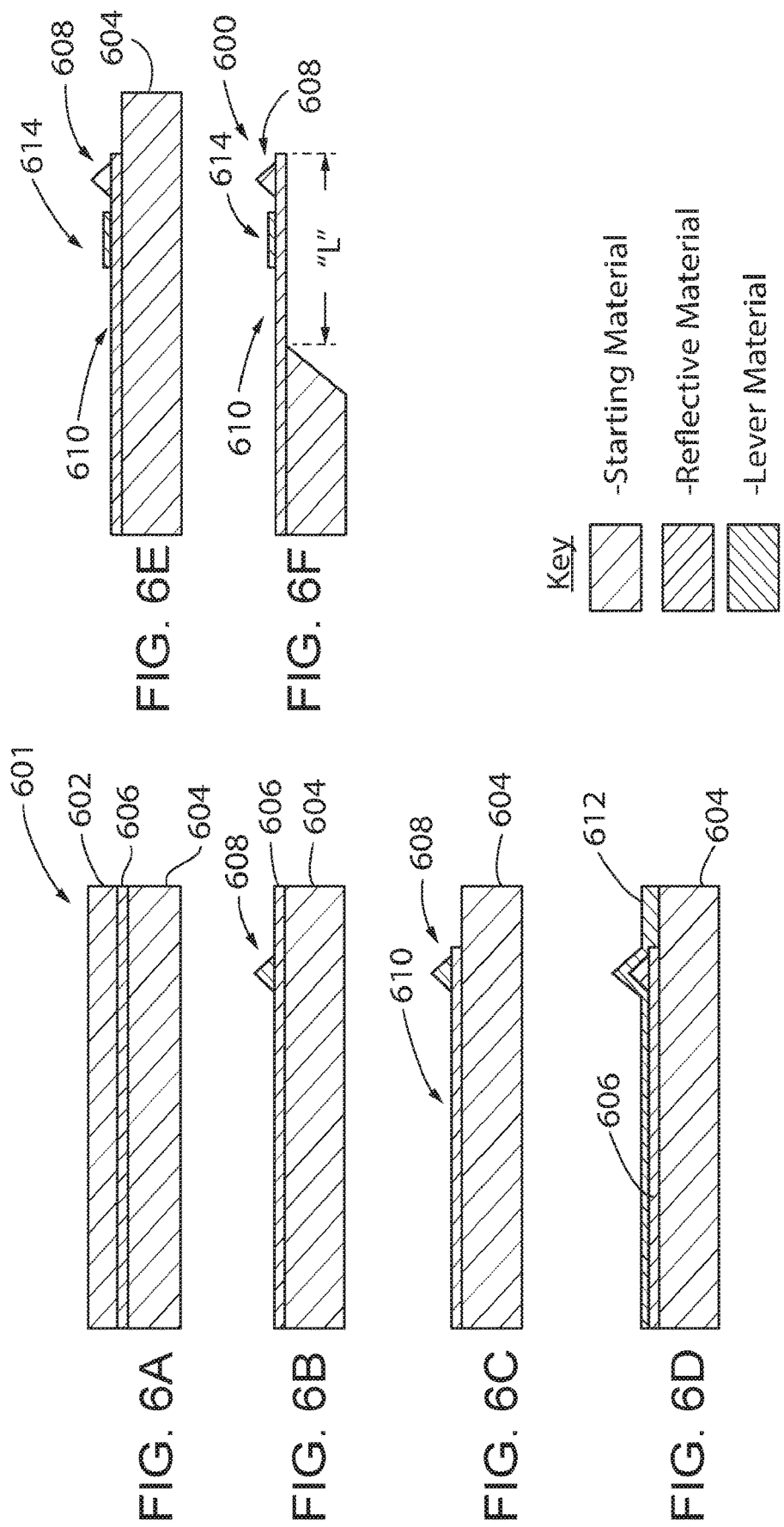

THERMALLY STABLE, DRIFT RESISTANT PROBE FOR A SCANNING PROBE MICROSCOPE AND METHOD OF MANUFACTURE

CROSS-REFERENCE TO RELATED APPLICATION

The present application claims the priority benefit from U.S. Provisional Application No. 62/540,959, filed on Aug. 3, 2017, and U.S. Provisional Application No. 62/541,617, filed on Aug. 4, 2017, of which is entitled Probe for a Scanning Probe Microscope and Method of Manufacture. The subject matter of these applications is hereby incorporated by reference in their entirety.

BACKGROUND OF THE INVENTION

Field of the Invention

The preferred embodiments are directed to a probe assembly for a metrology instrument and a corresponding method of manufacture, and more particularly, a probe assembly less susceptible to thermal drift compared to standard AFM probe assemblies of similar size and function.

Description of Related Art

Scanning probe microscopes (SPMs), such as the atomic force microscope (AFM), are devices which use a sharp tip and low forces to characterize the surface of a sample down to atomic dimensions. Generally, the tip of the SPM probe is introduced to the sample surface to detect changes in the characteristics of the sample. By providing relative scanning movement between the tip and the sample, surface characteristic data can be acquired over a particular region of the sample and a corresponding map of the sample can be generated.

A typical AFM system is shown schematically in FIG. 1. An AFM 10 employing a probe device 12 including a probe 14 having a cantilever 15. Scanner 24 generates relative motion between the probe 14 and sample 22 while the probe-sample interaction is measured. In this way images or other measurements of the sample can be obtained. Scanner 24 is typically comprised of one or more actuators that usually generate motion in three orthogonal directions (XYZ). Often, scanner 24 is a single integrated unit that includes one or more actuators to move either the sample or the probe in all three axes, for example, a piezoelectric tube actuator. Alternatively, the scanner may be an assembly of multiple separate actuators. Some AFMs separate the scanner into multiple components, for example an XY scanner that moves the sample and a separate Z-actuator that moves the probe. The instrument is thus capable of creating relative motion between the probe and the sample while measuring the topography or some other surface property of the sample as described, e.g., in Hansma et al. U.S. Pat. No. RE 34,489; Elings et al. U.S. Pat. No. 5,266,801; and Elings et al. U.S. Pat. No. 5,412,980.

In a common configuration, probe 14 is often coupled to an oscillating actuator or drive 16 that is used to drive probe 14 at or near a resonant frequency of cantilever 15. Alternative arrangements measure the deflection, torsion, or other motion of cantilever 15. Probe 14 is often a microfabricated cantilever with an integrated tip 17.

Commonly, an electronic signal is applied from an AC signal source 18 under control of an SPM controller 20 to cause actuator 16 (or alternatively scanner 24) to drive the probe 14 to oscillate. The probe-sample interaction is typically controlled via feedback by controller 20. Notably, the actuator 16 may be coupled to the scanner 24 and probe 14 but may be formed integrally with the cantilever 15 of probe 14 as part of a self-actuated cantilever/probe.

Often a selected probe 14 is oscillated and brought into contact with sample 22 as sample characteristics are monitored by detecting changes in one or more characteristics of the oscillation of probe 14, as described above. In this regard, a deflection detection apparatus 25 is typically employed to direct a beam towards the backside of probe 14, the beam then being reflected towards a detector 26. As the beam translates across detector 26, appropriate signals are processed at block 28 to, for example, determine RMS deflection and transmit the same to controller 20, which processes the signals to determine changes in the oscillation of probe 14. In general, controller 20 generates control signals to maintain a relative constant interaction between the tip and sample (or deflection of the lever 15), typically to maintain a setpoint characteristic of the oscillation of probe 14. More particularly, controller 20 may include a PI Gain Control block 32 and a High Voltage Amplifier 34 that condition an error signal obtained by comparing, with circuit 30, a signal corresponding to probe deflection caused by tip-sample interaction with a setpoint. For example, controller 20 is often used to maintain the oscillation amplitude at a setpoint value, AS, to insure a generally constant force between the tip and sample. Alternatively, a setpoint phase or frequency may be used.

A workstation 40 is also provided, in the controller 20 and/or in a separate controller or system of connected or stand-alone controllers, that receives the collected data from the controller and manipulates the data obtained during scanning to perform point selection, curve fitting, and distance determining operations.

AFMs may be designed to operate in a variety of modes, including contact mode and oscillating mode. Operation is accomplished by moving either the sample or the probe assembly up and down relatively perpendicular to the surface of the sample in response to a deflection of the cantilever of the probe assembly as it is scanned across the surface. Scanning typically occurs in an "x-y" plane that is at least generally parallel to the surface of the sample, and the vertical movement occurs in the "z" direction that is perpendicular to the x-y plane. Note that many samples have roughness, curvature and tilt that deviate from a flat plane, hence the use of the term "generally parallel." In this way, the data associated with this vertical motion can be stored and then used to construct an image of the sample surface corresponding to the sample characteristic being measured, e.g., surface topography.

In an AFM, for example, in a mode of operation called contact mode, the microscope typically scans the tip, while keeping the force of the tip on the surface of the sample generally constant. This is accomplished by moving either the sample or the probe assembly up and down relatively perpendicularly to the surface of the sample in response to a deflection of the cantilever of the probe assembly as it is scanned across the surface. In this way, the data associated with this vertical motion can be stored and then used to construct an image of the sample surface corresponding to the sample characteristic being measured, e.g., surface topography. Similarly, in another preferred mode of AFM operation, known as TappingMode™ (TappingMode™ is a trademark owned by the present assignee), the tip is oscillated at or near a resonant frequency of the associated cantilever of the probe. The amplitude or phase of this oscillation is kept constant during scanning using feedback signals, which are generated in response to tip-sample interaction. As in contact mode, these feedback signals are then collected, stored and used as data to characterize the sample.

The deflection of the cantilever in response to the probe tip's interaction with the sample is measured with an extremely sensitive deflection detector, most often an optical lever system. In such optical systems, a lens is employed to focus a laser beam, from a source typically placed overhead of the cantilever, onto the back side of the cantilever. The backside of the lever (the side opposite the tip) is reflective (for example, using metalization during fabrication) so that the beam may be reflected therefrom towards a photodetector. The translation of the beam across the detector during operation provides a measure of the deflection of the lever, which again is indicative of one or more sample characteristics.

One significant drawback with standard probes is that they are susceptible to thermal drift. Because the backside of the AFM cantilever is typically coated with a thin metal film having a coefficient of thermal expansion that is different from that of the cantilever material, the cantilever can drift, e.g., bend, due to the bimetallic effect when temperature changes.

Different solutions have been devised to attempt to accommodate this issue of thermal drift in AFM probes. In one, uncoated probes are employed. Stripping metal from the probe cantilever eliminates the bimetallic effect. Unfortunately, the laser reflection sum signal is highly reduced using this technique. When improvements in AFM operating speed and resolution continue to be made, maintaining signal strength is of continuing importance.

In another solution, probes coated with metal on both sides (double-side coating) are used. Coating the side of cantilever opposite the original metal coating with a similar one balances the bimetallic effect. Theoretically, this could work; however, this technique, in practical application, is unstable since it is very difficult to fabricate the probes so that the two metal coatings are exactly balanced in terms of stress and thickness.

Some AFM developers have tried restricted metal coatings. In this case, to reduce drift due to the bimetallic effect, the metal coating is restricted to the distal end of the backside of the cantilever. However, the metal coating is typically applied by evaporation through a shadow mask, which often leads to variable probe-to-probe thermal drift performance, and lack of scalability, particularly in terms of reduction in size of the metal coated area.

In view of the above, scanning probe microscopy was in need of a probe assembly that is highly stable with reduced thermal drift compared to current solutions such as probes with levers having their front and back surfaces coated with a similar metal, scalable down to sub-micron dimensions, yet does not compromise the system's ability to collect high quality force microscopy data.

Note that "SPM" and the acronyms for the specific types of SPMs, may be used herein to refer to either the microscope apparatus, or the associated technique, e.g., "atomic force microscopy."

SUMMARY OF THE INVENTION

The preferred embodiments overcome the drawbacks of prior solutions by providing a probe and corresponding method of manufacture that uses photolithographic techniques to define a metal (or dielectric) area at the distal end of the lever (front or back side) scalable beyond the limit of other techniques of restricted metal coating (i.e., less than about 25 microns). The preferred embodiments do so with no loss of pattern fidelity and increased probe-to-probe repeatability compared to shadow mask-based processes that have a finite stand-off between the AFM probe cantilever and its shadow mask aperture in a line-of-sight-based evaporation process.

The preferred embodiments also enable the ability to pattern the metal areas at the distal ends of cantilevers with varying lengths, simultaneously. In addition, the method of manufacture enables the ability to produce arbitrary patterns on the cantilevers, for example, to mirror the laser spot shape of the beam bounce optical detection system of the AFM. Note that for further background regarding the preferred embodiments, Appendix A is provided for reference.

According to a first aspect of the preferred embodiment, a probe assembly for a surface analysis instrument includes a substrate defining a base of the probe assembly, a cantilever extending from the base and having a distal end, and a reflective pad disposed at the distal end. The reflective pad has lateral dimensions that are precisely controllable at any point on the cantilever to less than about plus or minus twenty-five (25) microns.

According to a further aspect of the preferred embodiment, the reflective pad is patterned on the cantilever using photolithography. Furthermore, the reflective pad is disposed on the front side of the cantilever. The reflective paid may also be metal.

In another aspect of this embodiment, the reflective pad has a dimension less than one (1) micron.

According to a still further aspect of the preferred embodiment, the surface analysis instrument is an AFM.

According to an alternate aspect of the preferred embodiment, a method of fabricating a probe assembly for a surface analysis instrument includes providing a substrate, forming a probe of the probe assembly from the substrate, the probe including a cantilever having a free end with a distal end, and a tip, and patterning a reflective pad on the cantilever using photolithography. Furthermore, the dimension of the pad is less than twenty-five (25) microns.

In another aspect of this embodiment, the patterning step is performed on a front side of the cantilever.

According to a still further aspect of the preferred embodiment, the forming step includes using one of low pressure chemical vapor deposition (LPCVD) silicon nitride on the substrate, Plasma Enhanced Chemical Vapor Deposition (PECVD) silicon nitride on the substrate, and a Silicon-on-Nitride (SON) substrate.

In another aspect of this embodiment, the dimension of the pad is less than one (1) micron.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIGS. 4A-4G are schematic side elevational views of alternate embodiments of drift compensated AFM probe assemblies using photolithographically patterned reflective regions;

FIGS. 5A-5G is a series of schematic side elevational illustrations showing the steps to batch microfabricate the probe assembly of FIG. 2; and FIGS. 6A-6F is a series of schematic side elevational illustrations showing the steps to batch microfabricate the probe assembly of FIG. 2, according to an alternate method.

DETAILED DESCRIPTION OF THE PREFERRED EMBODIMENT

Figure 1:
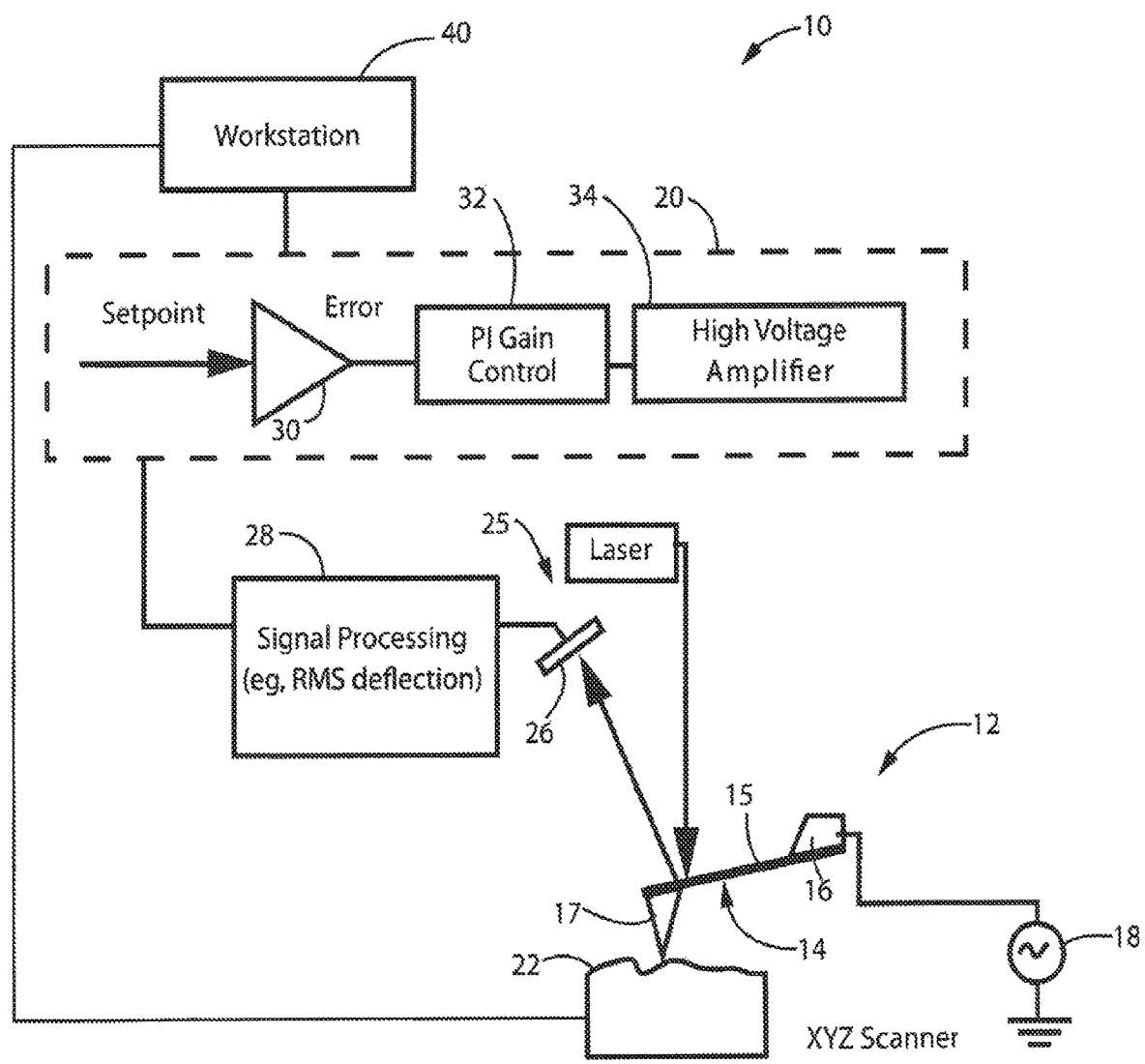
FIG. 1 is a schematic illustration of a Prior Art atomic force microscope.
Figure 2:
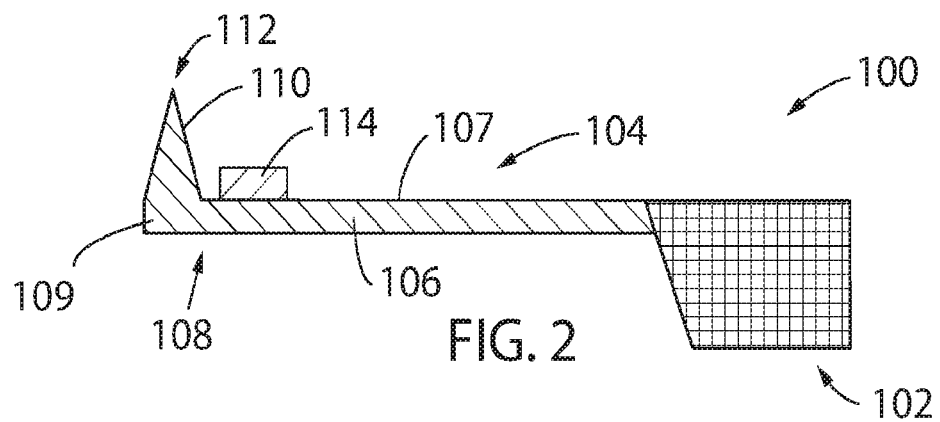
FIG. 2 is a schematic side elevational view of a probe according to a preferred embodiment.

Turning initially to FIG. 2, a schematic probe assembly 100 for an atomic force microscope (AFM) fabricated according to the preferred embodiments is shown. Photolithographic techniques are used to define a metal (or dielectric) area or region on the distal end of the probe to accommodate adverse thermal drift effects common when operating an AFM.

Probe assembly 100 includes a base 102 produced when forming a cantilever 106 of a probe 104, typically from a silicon substrate (described further below). Cantilever 106 includes a free end 108 having a distal end 109 from which a tip 110 is supported. Tip 110 has an apex 112 that interacts with the surface of a sample when imaging the same with the AFM. To accommodate the optical detection scheme used to measure probe/cantilever deflection, a reflective region is formed on the lever. In this case, the reflective region is a metal pad 114 (sub-micron to 100s of microns, depending on size of cantilever) formed on a front side 107 of lever 106. Unlike known AFM probes, using pad 114 patterned according to photolithographic techniques, the preferred embodiments equip the probe with the reflective properties needed for optimum detection of cantilever deflection, while minimizing the amount of metal used and therefore the bimetallic effect that can cause the thermal drift problems discussed previously. Note that while pad 114 is situated on the front side of cantilever 106, cantilever 106 is sufficiently thin so that laser light from the optical beam-bounce scheme is able to pass there-through and reflect toward the detector, e.g., quadrant photodiode.

Figure 3:
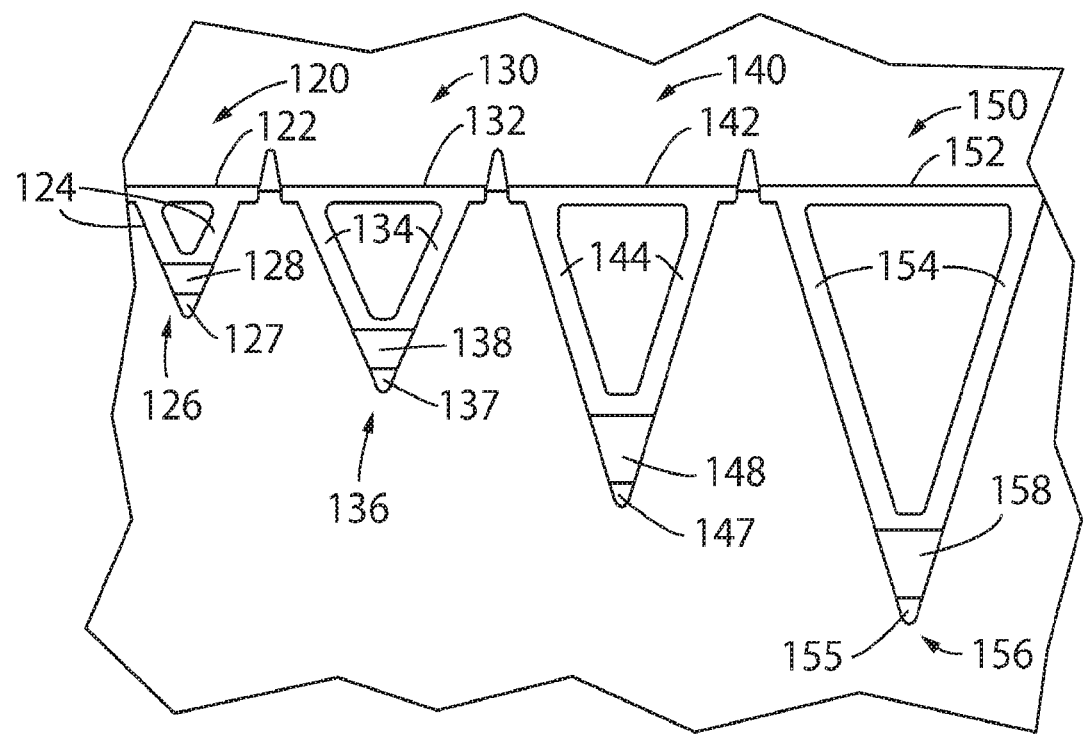
FIG. 3 is a schematic front side view of a series of probes having varying geometries and with reflective pads on their front sides photolithographically patterned according to the preferred embodiments.

Turning next to FIG. 3, an illustration of batch fabricated probes formed using, for example, a silicon wafer. More particularly, probes 120, 130, 140, 150 of different geometries (standard AFM probes of increasing length) are produced from the same silicon wafer. Probe 120, includes a base 122, with cantilever arms 124 extending therefrom, and having a distal end 126 that supports a tip 127. Reflective region 128 is photolithographically patterned on the front side of the lever near the distal end as well. Similarly, probes 130, 140, 150 have arms 134, 144, 154 extending from respective bases 132, 142, 152, and include distal ends 136, 146, 156 supporting tips 137, 147, 157. As with shorter probe 120, probes 130, 140, 150 include a reflective pad/region 138, 148, 158 adjacent their distal ends.

A series of alternative photolithographically patterned reflective regions/pads are shown in FIGS. 4A-4G. In FIG. 4A, a probe 200 includes a cantilever 202 having a distal end 204 supporting a tip 206 having an apex 208. In this case, a reflective pad 210 (metal/dielectric) is patterned on a backside 203 of lever 203 (rather than on the front side as in FIG. 2). The advantage of this design is that direct reflection of the AFM laser is provided (as opposed to having to pass through the cantilever material—typically silicon nitride), thereby enhancing deflection signal strength. FIGS. 4B and 4C show two embodiments in which two pads are disposed on each lever, one for accommodating a laser used to drive the cantilever in the AFM mode selected, and the other for detection of probe motion. FIG. 4B shows a probe 220 having a cantilever 222 with a distal end 224 having a tip 226 with an apex 228. In this case, two pads 230, 232 having different reflective properties are supported on a front side 213 of cantilever 222. An example of this would be a cantilever in which one pad is used for sensing its displacement, and the other for driving it using different wavelength lasers. Both pads do not necessarily have to be on its distal end. Similarly, probe 240 shown in FIG. 4C includes two pads 250, 252 but supported on a backside 243 of a cantilever 242 having a distal end 244 from which protrudes a tip 246 having an apex 248.

Turning next to FIG. 4D, a probe 260 including a cantilever 262 having a backside 263 and a distal end 264 supporting a tip 266 with an apex 268 is designed for optimum deflection sensitivity. In this case, a reflective (e.g., metal) pad is photolithographically patterned to extend all the way to the tip, a length "L" (sub-micron to 100s of microns, depending on size of cantilever) at the distal end 264 of lever 262. More reflective material is used in this case possibly lessening the thermal drift benefits of using a reflective pad but more of the laser light may captured and reflected in the detection scheme. FIG. 4E illustrates a probe 280 having a cantilever 282 with a pad 292 disposed on a front side 283 of the lever. Probe also includes a tip 286 having an apex 288, the tip being coated with a material 290 to pre-functionalize the same; for example, to accommodate bio/electrical/magnetic characterization of the sample.

Next, with reference to FIGS. 4F and 4G, photolithography is used to pattern both sides of the cantilever. In particular, in FIG. 4G, a probe 300 includes a cantilever 302 having a distal end 304 with tip 306 extending therefrom and having an apex 308 that interacts with a sample surface (not shown) during AFM operation. Cantilever 302 includes front and back sides 303, 305, respectively, supporting reflective layers 310, 312. Similarly, a probe 320 in FIG. 4G includes a cantilever 322 having a distal end 324 with tip 326 extending therefrom and having an apex 328 that interacts with a sample surface. Cantilever 322 includes front and back sides 323, 325, respectively, supporting reflective layers 330, 332. Additionally, the FIG. 4G probe includes a coating 334 on tip 326 of a different material to accommodate bio/magnetic/electrical characterization of the sample under test. In both of these cases, the double sided coating of the cantilever is performed with highly stressed material (used in some applications, e.g., cell-imaging, chemical analyses, electrical analyses as understood in the art) that would bend the cantilever if only one side was coated.

Turning to FIGS. 5A-5G, a method of fabricating a thermally compensated probe assembly according to the preferred embodiments, such as that shown in FIG. 2, is illustrated. Note that while the fabrication of a probe such as those shown above is described, it is understood that the description also applies to batch fabricating probes of varying properties. Initially, a starting material 500, such as a silicon wafer, is provided in FIG. 5A. Next, in Figure SB, a tip 502 is formed using lithography employing appropriate masks and a wet (or dry) etch of the silicon anisotropically (convex mold). In FIG. 5C, a lever material 504 is deposited, typically a nitride using LPCVD (Low Pressure Chemical Vapor Deposition) or PECVD (Plasma Enhanced Chemical Vapor Deposition), or sputtering.

With reference to FIG. 5D, the formation of the reflective region or pad begins by evaporating or sputtering or electroplating a reflective material 506 to create a coating on what will be, in this case, the front side of the probe. Typically, the reflective material will be aluminum, chrome and/or gold. Then, as shown in FIG. 5E, a pad lithography step is performed by patterning the metal layer/coating to create a reflective pad or region 508. Notably, using the present lithography techniques the shape of the pad can be tailored to mirror certain aspects of the AFM tool, e.g., the laser spot shape in the optical deflection detection apparatus. In FIG. 5F, to define the lever, lithography is again employed to pattern the same. Finally, in FIG. 5G, a cantilever etch is performed thereby defining, e.g., cantilever length. Tip 502 may be hollow, or not.

Turning to FIGS. 6A-6F, an alternate method of fabricating a thermally stable/drift resistant probe assembly 600 according to the preferred embodiments, such as that shown in FIG. 2, is illustrated. Again, it is understood that the description also applies to batch fabricating probes of varying properties. Initially, rather than a silicon wafer, a starting material 601, such as a silicon-on-nitride wafer, is provided in FIG. 6A. 602 is the silicon device layer, 606 is the embedded lever material (typically nitride ($Si_3N_4$), or a combination of same with other dielectric material), and 604 is the silicon handle layer (base of the probe assembly 600). Next, in FIG. 6B, a tip 608 is formed using lithography employing appropriate masks and a wet (or dry) etch of the silicon anisotropically. In FIG. 6C, the lever material 606 is patterned using photolithography to make it into lever 610.

With reference to FIG. 6D, formation of the reflective region or pad begins by evaporating or sputtering or electroplating a reflective material 612 to create a coating on what will be, in this case, the front side of the probe. Typically, the reflective material will be aluminum, chrome (a high stress material for certain applications) and/or gold. Then, as shown in FIG. 6E, a pad lithography step is performed by patterning the metal layer/coating to create a reflective pad or region 614. Finally, in FIG. 6F, a cantilever etch is performed thereby defining, e.g., cantilever length "L". Similar to tip 502 of probe 500, tip 608 may be hollow, or not.

In sum, by using photolithography to create fine-tuned regions of reflective material on AFM probes, the field of atomic force microscopy has a solution to significantly, i.e., greater than an order of magnitude, de-sensitize AFM probes to thermal drift. Unlike prior attempts to overcome the thermal drift problem, e.g., as it relates to the bimetallic effect caused by the reflective material on the probe used to facilitate detection of probe movement, the preferred embodiments are able to precisely and repeatedly control the lateral dimensions (e.g., length/width) of the reflective region to an amount less than +/−25 microns, in some cases sub-micron for ideal thermal properties. This will allow AFM to open up new application areas, including but not limited to force clamping, pull-and-hold protein folding/refolding, etc.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. A probe assembly for a surface analysis instrument, the probe assembly including:
   a substrate defining a base of the probe assembly;
   a cantilever extending from the base and having a free end, the cantilever including front and back sides, the front side supporting a tip, the cantilever and tip defining a probe; and
   a reflective pad disposed near the free end, wherein the reflective pad is patterned on the front side of the cantilever supporting the tip of the fabricated probe using photolithography.

2. The probe assembly of claim 1, wherein the reflective pad has a lateral dimension that is controllable to less than about plus or minus twenty-five (25) microns at any point on the cantilever.

3. The probe assembly of claim 2, wherein the dimension is less than a micron.

4. The probe assembly of claim 3, wherein the lateral dimension is at least one of a length and a width.

5. The probe assembly of claim 2, wherein the reflective pad extends to a distal end of the free end.

6. The probe assembly of claim 1, wherein the at least one reflective pad includes a reflective pad disposed on the front side of the cantilever and a reflective pad disposed on the back side of the cantilever.

7. The probe assembly of claim 6, where the material of the at least one reflective pad is a high stress material.

8. The probe assembly of claim 1, wherein the at least one reflective pad includes at least two reflective pads, one to accommodate deflection measurement, and another to accommodate driving the probe assembly according to the AFM mode of operation.

9. The probe assembly of claim 2, wherein the reflective pad is at least one of a dielectric and a metal.

10. The probe assembly of claim 1, wherein the surface analysis instrument is an AFM.

11. The probe assembly of claim 8, wherein a dimension of the at least one reflective pad depends on a length of the cantilever.

12. The probe assembly of claim 1, wherein the substrate is one of a silicon wafer and a silicon-on-nitride wafer.

13. A method of fabricating a probe assembly for a surface analysis instrument, the method including:
   providing a substrate;
   forming a probe of the probe assembly from the substrate, the probe including a cantilever having a free end supporting a tip;
   patterning at least one reflective pad on a front side of the cantilever, the front side supporting the tip, using photolithography; and
   wherein a dimension of the pad is less than twenty-five (25) microns.

14. The method of claim 13, wherein the forming step includes using one of low pressure chemical vapor deposition (LPCVD) and Plasma Enhanced Chemical Vapor Deposition (PECVD) to deposit silicon nitride on the substrate.

15. The method of claim 13, wherein the dimension is sub-micron.

16. The method of claim 13, wherein the substrate is one of a silicon wafer and a silicon-on-nitride wafer.

17. The method of claim 13, wherein the at least one reflective pad includes at least two reflective pads, one for driving the probe according to a mode of operation of the surface analysis instrument and one for accommodating deflection measurement of the probe.

18. The method of claim 13, wherein the patterning step includes shaping the pad to correspond to the shape of a laser beam of a deflection detection apparatus of the surface analysis instrument.

* * * * *